United States Patent

Klyamkin et al.

[15] 3,675,082
[45] July 4, 1972

[54] DIRECT-CURRENT POWER TRANSMISSION LINE

[72] Inventors: Semen Solomonovich Klyamkin, prospekt M. Toreza, 38, korpus I, kv. 64; Jury Solomonovich Kraichik, prospekt Smirnova, 16, korpus 2, kv. 39, both of Leningrad, U.S.S.R.

[22] Filed: Dec. 3, 1970

[21] Appl. No.: 94,746

[52] U.S. Cl. ................................ 317/20, 307/93, 317/53, 317/61.5
[51] Int. Cl. ............................................................ H02h 3/20
[58] Field of Search .................. 317/20, 44, 53, 61.5; 307/93

[56] References Cited

UNITED STATES PATENTS

| | | | |
|---|---|---|---|
| 790,179 | 11/1904 | Braun | 317/61.5 X |
| 1,211,822 | 1/1917 | Chernysnoff | 317/61.5 |
| 1,225,587 | 5/1917 | Creighton | 317/61.5 |
| 2,730,667 | 1/1956 | Uhlmann | 307/93 X |

Primary Examiner—James D. Trammell
Attorney—Holman & Stern

[57] ABSTRACT

An improvised a.c. limiter arrangement in a d.c. transmission line having earth wires, comprises connecting a.c. limiters which include reactive elements, in an electric circuit formed by the earth wires.

The loops formed by the earth wires and the a.c. limiters produce an electromagnetic effect on the loops formed by the line conductors. By suitably selecting the reactive elements, it is possible to raise the a.c. resistance of the loop formed by the line conductors and thus to reduce the a.c. component.

1 Claim, 1 Drawing Figure

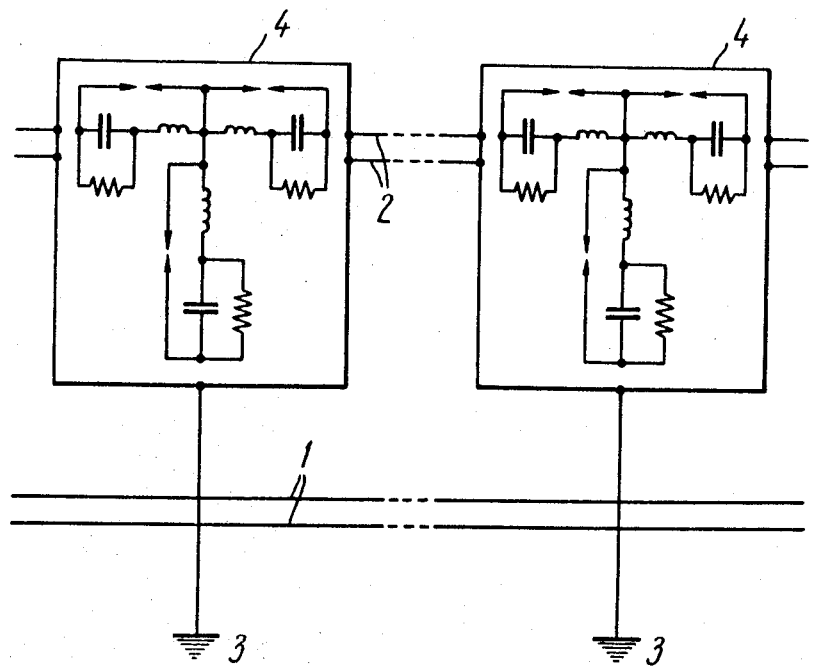

DIRECT-CURRENT POWER TRANSMISSION LINE

The present invention relates to an improvement in d.c. power transmission lines, with special reference to power transmission lines expending over large distance of the order of several hundred or even thousand kilometers.

As is known, undesirable a.c. components occur in d.c. power transmission lines. In order to reduce these a.c. components, a variety of limiters are used, connected directly to the line conductors. Ordinarily, such a limiter comprises reactors connected in series with the power transmission line and resistive-reactive elements connected in parallel with the reactors. (see, for example, U.S. Pat. No, 2,730,667). Such limiters increase the a.c. resistance of the line to alternating current and reduce the a.c. components.

In some cases, limiters are made up of resistive-reactive elements and are connected in parallel with the line conductors.

When reactors or any other circuit components are connected in series, they carry the total direct current which is many times the alternating current. Therefore, the reactors (and, similarly, other circuit components) must be designed from consideration of the direct current in the line, a fact which complicates the design of the limiters, increases their size and raises their cost.

Parallel connected a.c. limiters suffer from a similar drawback, since in this case the elements must be designed for the total d.c. voltage.

Besides, the heavy direct currents and voltages involved adversely affect the adjustment and the range of regulation of the limiters.

An object of the present invention is to enhance the efficiency and to reduce the size of devices for limiting a.c. components in d.c. power transmission lines by connecting elements of the devices limiting alternating components of current and voltage in such a way that the direct components of current and voltage will not affect them.

This object is attained by the invention in that a.c. limiters are connected in a circuit of earth wires and have a frequency response such that the electromagnetic effect of the loops formed by the earth wires and the said limiters on loops formed by the line conductors increases the a.c. resistance of the latter.

With a.c. limiters thus connected, they are not affected by direct currents and voltages, owing to which their size can markedly be decreased in comparison with existing a.c. limiters. Besides, the fact that the limiters operate under easier conditions extends their range of adjustment and control.

The invention will be best understood from the following description of a preferred embodiment when read in connection with the accompanying drawing which shows a section of a d.c. power transmission line fitted with a.c. limiters connected to the earth wires.

Referring to the drawing, there is a d.c. power transmission line consisting of two conductors 1. Arranged along this line are earth wires 2 electrically connected to earth 3. The circuit of the earth wires contains limiters 4. Physically, a limiter 4 may be a network of reactors and capacitors or a network of capacitors. In some cases, these networks may incorporate resistors.

The relative position of the line conductors and the earth wires 2 on d.c. power transmission lines in such that a strong electromagnetic coupling exists between them. The effect of the earth wires 2 on the currents in and the voltages across the conductors 1 is equivalent to bringing certain additional impedances into the loops formed by the conductors 1 to a.c. components.

The magnitude of these additional impedances depends on the frequency response of the limiters 4. According to the invention, the frequency response of a.c. limiters 4 must be chosen such that the electromagnetic effect of the loops formed by the earth wires 2 and the limiters 4 or by the earth wires, the limiters 4 and earth will ensure an increase in the a.c. resistance of the loop formed by the conductors 1, so that the alternating components of current and voltage in the conductors will be reduced.

In the general case, the frequency response of the a.c. limiter 4 can be determined by solving the complete system of equations of a multi-conductor line for each harmonic of current and voltage in the conductors.

In some cases, the invention makes it possible to reduce the magnitude of, say, the sixth and 12th harmonics of current and voltage.

What we claim is:

1. A d.c. power transmission line comprising in combination: d.c. power transmission conductors; earth wires having earth connections and running parallelly of the power transmission conductors and disposed to have an electro-magnetic coupling with the power transmission conductors; and at least one a.c. limitor including reactive elements connected in series with one of said earth wires, so that, because of said electromagnetic coupling, additional impedances to any a.c. components are caused to be brought into the d.c. power transmission conductors.

* * * * *